Figure 1:
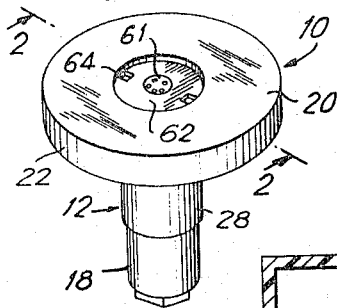

May 2, 1967  W. G. MUSCHETT  3,317,144

FLUSH SPRINKLER AND FITTING THEREFOR

Filed May 17, 1965  2 Sheets-Sheet 1

INVENTOR.
WILLIAM G. MUSCHETT

BY
ATTORNEYS

May 2, 1967  W. G. MUSCHETT  3,317,144
FLUSH SPRINKLER AND FITTING THEREFOR

Filed May 17, 1965  2 Sheets-Sheet 2

INVENTOR.
WILLIAM G. MUSCHETT
BY
ATTORNEYS

United States Patent Office 3,317,144
Patented May 2, 1967

---

3,317,144
FLUSH SPRINKLER AND FITTING THEREFOR
William G. Muschett, 6163 Rolling Road Drive,
Miami, Fla. 33156
Filed May 17, 1965, Ser. No. 456,381
7 Claims. (Cl. 239—204)

This invention relates to flush lawn and garden sprinklers and to a fitting therefor. More particularly the invention pertains to a new and improved sprinkler and fitting which are such that the sprinkler can be very easily and conveniently installed with the sprinkler head flush with the ground, i.e. on a level adjacent to the bases of the blades of grass.

Flush lawn and garden sprinkler systems constitute a convenient unobtrusive and time-saving arrangement for watering grass and gardens. Said systems basically involve the securement to a horizontal buried water pipe of a sprinkler head that either is fixed flush with the ground or is movable between a retracted position wherein it is flush with the ground and an elevated position above the ground. In its retracted position a pop-up head is out of the way and does not interfere with mowing the lawn or walking or running over the same. If of the pop-up type, the head is actuated to an elevated position by water pressure when the water is turned on and can sprinkle a wider area than an equivalent fixed head. Any desired type of sprinkling direction, density or pattern can be obtained by selecting a suitable construction of head.

The sprinkler head of a pop-up sprinkler is located in a mounting such as a standpipe in which it is axially reciprocable between its aforementioned retracted and elevated positions, and the standpipe heretofore has been secured to the buried pipe by a nipple projecting upwardly from the pipe. A fixed sprinkler head likewise has been secured by an erect nipple to the buried pipe.

A basic purpose of a flush sprinkler system is to avoid inconvenience and dangers of having sprinkler heads projecting above the ground. Where the heads are permanently above the ground, mowing of the lawn is made quite difficult because of the care that must be taken to avoid striking the heads and injuring them or the mower. Also, the heads are a constant source of accidents because they are hard to see and people are prone to trip on them, particularly children playing on the lawn.

The advantages of flush sprinklers are numerous since they provide a concealed, safe and effective sprinkler system. Nevertheless, conventional flush sprinklers have not obtained the popularity which they potentially should enjoy. The reason is that great difficulty is encountered in initially installing them and maintaining them in such positions that the heads are flush with the ground in the retracted or fixed positions thereof.

Conventionally, in order to achieve an installation wherein the head in its retracted or fixed position is flush with the ground, the pipe must be buried at a precise distance from the surface of the ground and/or the nipple must be cut to an exact length. In practice this is extremely difficult to accomplish, particularly in the case of the ordinary unskilled homeowner. Similar problems are present in attaching sprinklers to an already buried pipe.

More specifically, in an entirely new installation, i.e. one where a water pipe must first be buried and a trench dug in the ground, it is extremely difficult to dig the trench to exactly the correct depth. Accurate measuring is required for this as well as precision assembly. If the trench is dug too deeply the head will be below the surface and this may interfere with proper operation of the sprinkler since a low rise pop-up head may then not when elevated be high enough to sprinkle past the surrounding blades of grass; in addition, a sunken head will serve as a collecting point of soil and debris which will eventually cover it. On the other hand, if the pipe is not buried deeply enough, the head will project above the ground in its retracted or fixed position and interfere with mowing and in general constitute a hazard. Not only is the average user insufficiently skilled to accurately place the pipe, but even if it is initially properly located, the depth of the trench may change when the earth gets wet since the loosened earth of the trench tends to pack more tightly under the pipe when wet.

Where a flush sprinkler is to be connected to a pipe which is already buried, it is ordinarily extremely inconvenient to remove the pipe and relay it, and even if this were done the above described problems of an initial installation would still occur. Ordinarily, to attach a flush sprinkler to an already buried pipe, the nipple connecting the head to the pipe is cut to exactly the correct length for the new sprinkler head to be flush with the ground in its retracted or fixed position. The average home owner does not have facilities for cutting the nipple to proper length and rethreading its cut end. Thus, unless a standard length nipple, available through normal channels, happens to be of the correct length, a proper installation would have to be done by a skilled person at considerable cost. The likelihood of a standard length nipple being satisfactory is quite small since pipes are not ordinarily buried in laws to a specific standard depth, and they do not remain at that particular depth due to shifts in ground level. Indeed, an old pipe may well vary in depth from the surface throughout its length, thereby necessitating the accurate cutting of nipples to several different lengths.

Generally, even if a user were to succeed in initially positioning a flush sprinkler so that the head thereof was flush with the ground or to so attach a sprinkler to an already buried pipe, the aforementioned shifts in the earth caused by rain, freezing, thaws, etc. will change the depth of the pipe with time so as to lower or raise the sprinkler head with respect to the ground.

It is readily apparent from the foregoing that to be successful a flush sprinkler must not only be easily installable in the first instance or to an already buried pipe, but it must be possible to easily and conveniently adjust the height of the sprinkler head from time to time to compensate for shifts in the depth of the pipe. Such flush sprinklers have not hitherto been available, and the main purpose of the instant invention is to provide such sprinklers and a fitting for the same.

It is a principal object of the present invention to provide a flush sprinkler which together with a water pipe can be simply and easily installed in the ground with the pipe buried and the sprinkler head flush with the ground in its retracted or fixed position.

It is another object of the present invention to provide a flush sprinkler which can be simply and easily installed to a previously buried water pipe without moving the latter and yet with the sprinkler head level with the ground in its retracted position.

It is another object of the present invention to provide a flush sprinkler of the character described wherein the head can be simply and easily maintained level with the ground despite shifts in the depth of the pipe to which the sprinkler is attached.

It is another object of the present invention to provide a fitting for a flush sprinkler system whereby the foregoing objects can be achieved.

It is another object of the present invention to provide a flush sprinkler and fitting of the character described which are attractive, compact, rugged, and long-lasting and which can be inexpensively mass-produced on simple equipment from readily available materials.

These and various other objects and advantages of the present invention will become apparent to the reader in the following description.

The present invention accordingly consists in the features of construction, combinations of elements and arrangements of parts which will be exemplified in the devices hereinafter described and of which the scope of application will be indicated in the appended claims.

Figure 2:
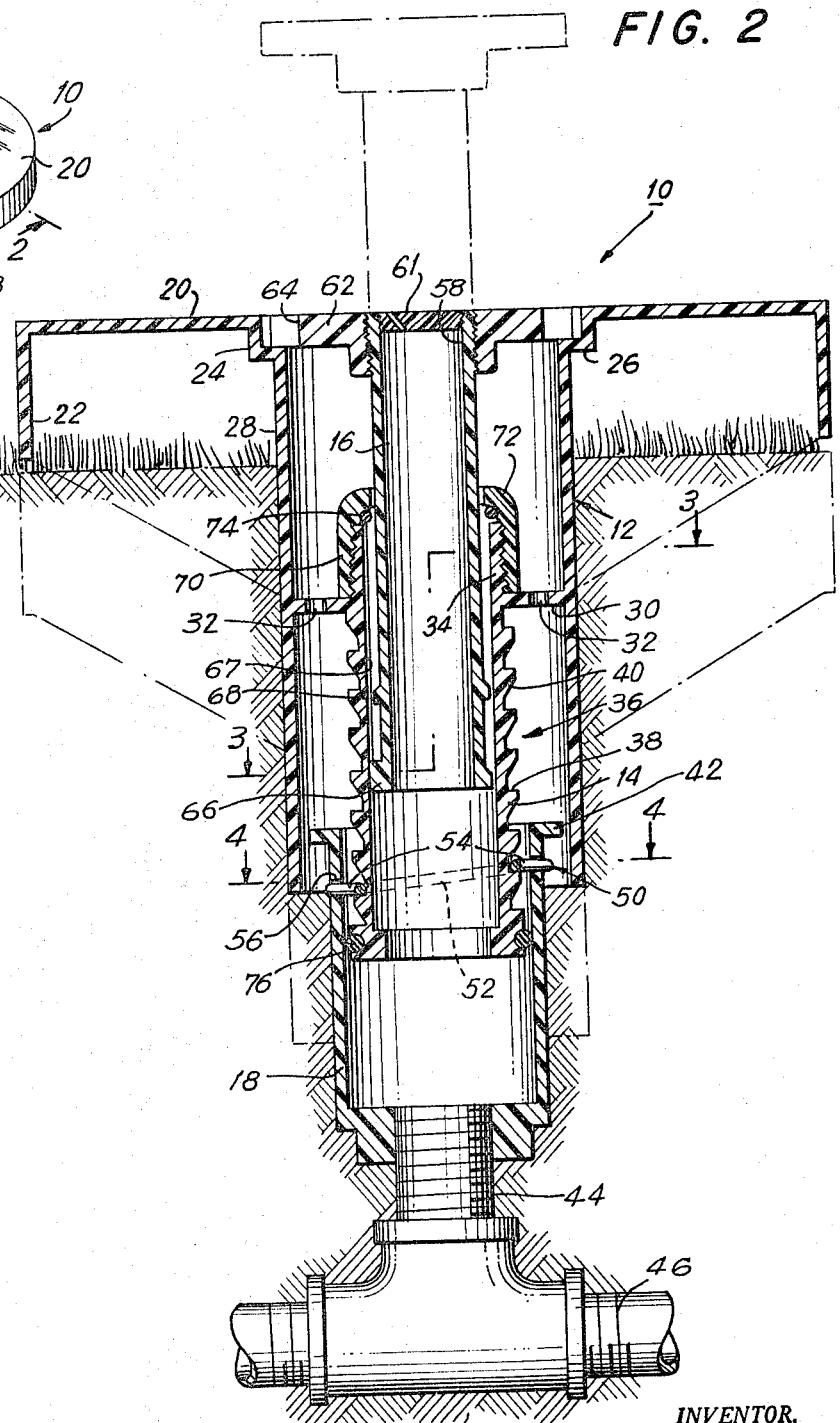
Figure 3:
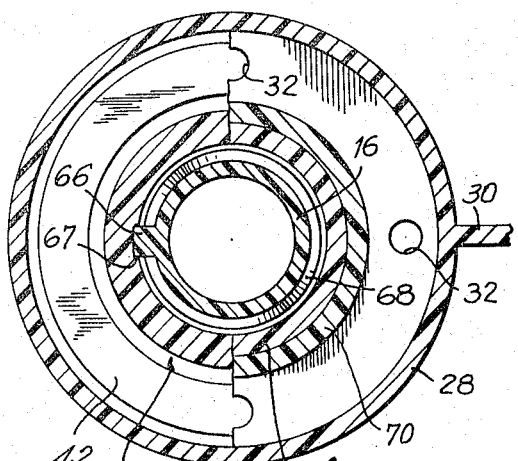
Figure 4:
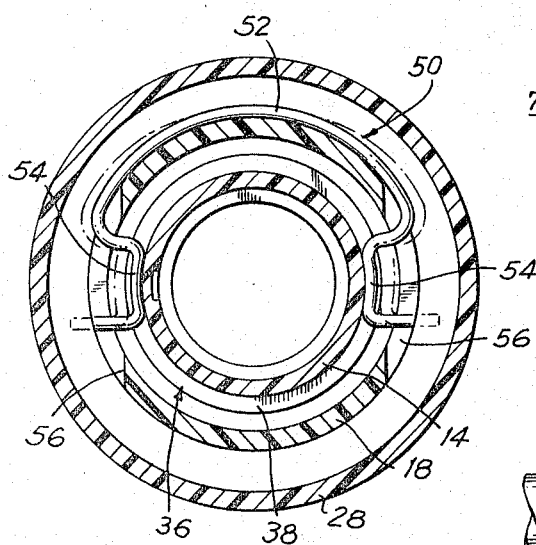
Figure 5:
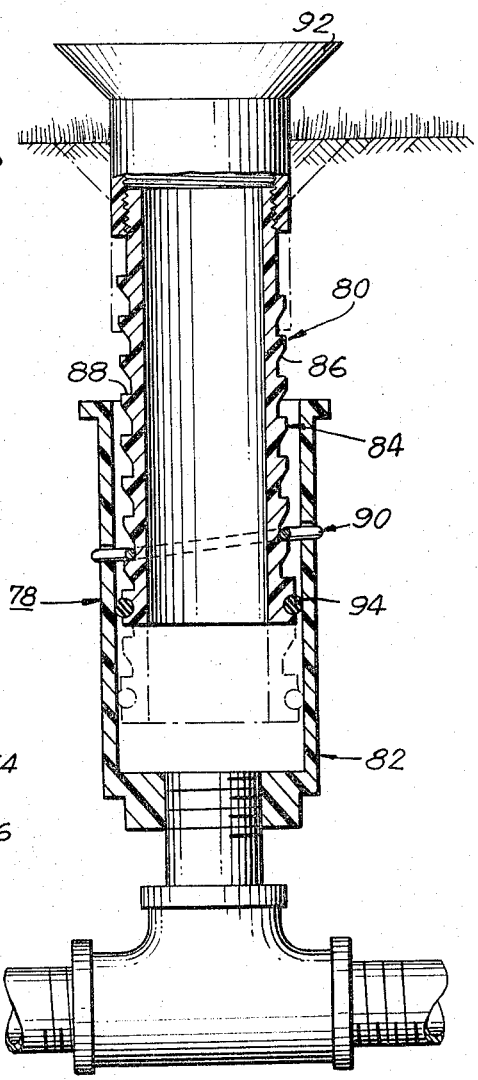

In the accompanying drawings in which are shown various possible embodiments of the invention, FIG. 1 is a perspective view of a pop-up flush sprinkler embodying the instant invention;

FIG. 2 is an enlarged sectional view taken substantially along the line 2—2 of FIG. 1 and showing the sprinkler connected to a buried water pipe;

FIGS. 3 and 4 are enlarged sectional views taken substantially along the lines 3—3 and 4—4, respectively of FIG. 2; and FIG. 5 is a sectional view of a stationary flush sprinkler head and the adjustable fitting embodying a modified form of the invention that is used to connect said head to a buried water pipe.

Generally, the objects of the present invention are carried out by providing a fitting comprising a pair of sleeves, one of which is telescopically, axially, slidably received in the other. One end of one sleeve is the inlet end of the fitting and is adapted to be hydraulically secured to a water pipe. The end of the other sleeve remote from the inlet end of the fitting is the outlet end of the fitting and is adapted to be hydraulically secured to a sprinkler head or other water distributing element.

Means is provided associated with the telescopically facing surfaces of the sleeves whereby said sleeves can be moved axially and non-rotatably with respect to one another in one direction, but said sleeves can be moved axially with respect to one another in the other axial direction only by rotation of said sleeves with respect to one another. This means constitutes a buttress thread on one facing surface and a cam carried by the other surface, said cam being mounted and biassed to retractably engage the thread. The thread includes a stop face and a camming face, and the sleeves can be moved axially and non-rotatably with respect to one another in the axial direction in which the cam is forced against camming face of the thread but the sleeves cannot be moved axially and non-rotatably with respect to one another in the opposite axial direction, i.e. the direction in which the cam is forced against the stop face of the buttress thread. The sleeves must be rotated with respect to one another to achieve axial movement in said opposite axial direction.

The thread and cam are arranged so that axial and non-rotating movement is permitted in the axial collapsing direction which will bring the outlet end of the fitting nearer to the inlet end of the fitting. Also, means is provided to seal the telescopically facing surfaces of the sleeves against the passage of water.

The foregoing fitting when provided with a sprinkler head, a housing and means permitting movement of the head between an upper (elevated) position and a lower (retracted) position constitutes a pop-up sprinkler embodying the instant invention. Said fitting may in accordance with the invention, also assume the form of a separate coupling that can be connected between a buried pipe and either a pop-up sprinkler or a fixed sprinkler.

It will be appreciated that when the fitting is interposed between a sprinkler head and a buried pipe, with the head above the ground, the head being retracted if of the pop-up type, the head can be lowered to an elevation flush with the ground by simply pressing it down (without the necessity of turning it) or alternatively pressing down the standpipe or mounting for the head if the head is of the pop-up type so as to collapse the fitting to the necessary length. The downward pressure can be applied in the easiest of all manners to wit by merely stepping on the head (or standpipe or mounting). However the fitting will not be expanded by water pressure and yet can be lengthened for reuse or to meet a changing condition by relatively turning the sleeves in a proper rotary direction.

More specifically, and referring now in detail to the drawings and to FIGS. 1–4 in particular, the reference numeral 10 denotes a pop-up sprinkler embodying the instant invention. Said sprinkler includes a housing 12, a first inner sleeve 14, a reciprocable hollow piston 16 slidably disposed in said sleeve, and a second outer sleeve 18 in which the first sleeve is telescopically slidable. The two sleeves basically make up the fitting of the present invention.

The housing includes a doughnut shaped ground shield 20 the outer edge of which is integral with an annular perpendicularly depending flange 22. The shield also is provided with an integral inner perpendicularly depending annular flange 24, said flange 24 being integral with a flat annular horizontal seat 26 disposed perpendicularly thereto. A depending cylindrical skirt 28 is provided integral with the inner edge of said seat at right angles thereto. The inner wall of said skirt defines the bore of the housing.

Both sleeves are receivable in the skirt, and means is provided to permanently secure the first sleeve 14 to the skirt. Said means comprises a ring 30 integrally forming the inner surface of the skirt to the outer surface of said first sleeve. The ring is located about midway between the top and bottom ends of the skirt, as seen in FIG. 2. Drain openings 32 are formed in said ring.

The inner sleeve 14 extends a short distance above the ring 30, and the portion 34 extending above said ring is provided with a male V-thread. A substantial portion of said sleeve depends below the ring, and pursuant to the instant invention said portion is provided with a male buttress thread 36. Said buttress thread includes a stop face 38 disposed perpendicularly to the longitudinal axis of the sleeve and facing upwardly (as seen in FIG. 2) and an upwardly and radially outwardly slanting cam face 40. The cam face faces downwardly and outwardly.

The outer sleeve 18 includes an annular guard flange 42 integral with the upper end thereof and extending outwardly at right angles thereto to minimize intrusion of soil during and after installation of a sprinkling head equipped with the fitting. The opposite, i.e. lower, end of the inner sleeve constitutes the inlet end of the sprinkler and has means for effecting a hydraulic connection, e.g. it is tapped so that it can be screwed on to a nipple 44 that extends upwardly from a buried water pipe 46 in the ground 48.

Further pursuant to the instant invention, a radially inwardly biased retractable camming means is associated with the outer sleeve 18. As can best be seen in FIG. 4 said means in the form it here takes constitutes a C-clip 50 oriented circumferentially of the outer sleeve. Said clip is made of a strong resilient material such, for example, as spring steel and includes a bow 52 and two radially inwardly protruding tips 54 integral with and disposed at the ends of the bow. The clip is so shaped that the bow rests against the outer surface of the second sleeve 18 and its tips 54 extend through slots 56 formed in the said sleeve near the upper end thereof. The tips are biased by the bow 52 into the bore of the outer sleeve 18 and into engagement with the buttress thread 36 of the inner sleeve 14. Said tips can be cammed radially outwardly, however, due to the flexibility of the C-clip. The slots are 180° apart and are relatively displaced axially of the outer sleeve by one-half the pitch of the buttress thread 36.

As is apparent from the foregoing, the inner sleeve can be moved axially downwardly (as seen in FIG. 2) with respect to the outer sleeve without rotating either sleeve. This is because the camming face 40 of the buttress thread of the inner sleeve will cam the tips of the C-clip radially outwardly when the inner sleeve is moved downwardly, whereby relative downward axial movement of the inner sleeve can take place. However, abutment of the tips 54 and the stop face 38 of the buttress inner thread prevents non-rotative axial upward movement (as seen in FIG. 2) of its sleeve with respect to the outer sleeve, and to achieve upward movement of the inner sleeve with respect to the outer sleeve the former must be rotated in an unscrewing direction with respect to the latter. During such rotation the tips of the C-clip ride on the buttress thread.

As a result of the structure described above, the sleeves can be telescoped to any desired extent so as to bring the inlet and outlet ends of the sleeves closer together by simply pushing down on the inner sleeve, but the sleeves can be mutually expanded, i.e. the inlet and outlet ends moved apart to extend the height of the sprinkler, only by proper rotation of one sleeve with respect to the other.

The open upper end 58 of the hollow piston 16 constitutes the outlet end of the sprinkler and is provided with a female thread for hydraulic securement thereto of a sprinkler perforated plug 61 (head) or other suitable sprinkling or spraying element. A circular guard 62 is threaded on to the piston and is of such diameter that it is receivable on the seat 26 of the shield 20 and within the flange 24. Abutment of the guard and seat defines the retracted position of the head 61, and the thickness of the guard 62 is such that in said position the guard does not extend above the shield. The guard includes through drain openings 64.

The piston is provided with a key 66 in the lower end thereof. Said key is slidably received in a vertical keyway 67 formed in the inner surface of sleeve 14, as can best be seen in FIG. 3, to prevent rotation of the piston with respect to the sleeve. This arrangement may be omitted if desired.

The piston also includes an annular sealing flange 68 disposed near but spaced from the bottom end thereof. A cap 70 is screwed onto the upper portion 34 of the inner sleeve, said cap including an apertured crown 72 which extends slightly over the bore of the inner sleeve 14 but provides an opening slightly larger than the outer diameter of the piston 16, exclusive of the flange 68. The cap does, however, extend into the path of travel of said flange 68, and abutment of said cap and flange defines the elevated position of the sprinkler head.

In elevated position of the sprinkler head a water-tight seal is formed between the flange 68 and the cap 70 as by an O-ring 74 carried by the cap and at this time bearing against the flange 68. During erection of the sprinkler head water flushes out of the clearance between the piston and the crown as explained in U.S. Letters Patent No. 3,104,822 issued Sept. 24, 1963.

In accordance with the invention a water-tight slidable seal is provided between the inner and outer sleeves. Said seal constitutes an elastomeric O-ring 76 radially compressed between the inner surface of outer sleeve 18 and a circumferential channel in a flange at the lower end of the outer sleeve 14. The O-ring is axially located between the inlet end of the sleeve 18 and the slots 56.

The above described pop-up sprinkler is installed as follows: first, the sleeves are rotated axially with respect to one another so as to separate the inlet and outlet ends of the sleeves as far as possible. In this position the sprinkler is at its maximum height. The inlet end is then screwed on to the nipple 44 of the water supply pipe 46. If a new installation is being made the next step is to bury the pipe to a depth such that the lower edge of the flange 22 of the shield 20 is somewhat above the ground. If the sprinkler is being connected to an already buried pipe 46, a nipple of such length is used between the pipe and the inlet end of the sprinkler that when the sprinkler is attached to the nipple the lower edge of the flange 22 can be oriented (by rotation of the sleeves with respect to one another) so as to be somewhat above the ground. After the earth is replaced around and below the sprinkler, the shield 20 is pressed into the ground until the top of the shield is level with the ground; this may be accomplished simply by stepping on the shield. As a result of the structure previously described above, the sleeves telescope without having to rotate the same so that the top of the shield can be aligned exactly with the ground without rotation of any part of the sprinkler and by merely stepping on the shield.

In FIG. 2 the shield is shown in solid lines in its position before being pressed against the ground. The dot-and-dash lines indicate the position of the shield after the flange 22 has been pressed into the ground. Since the sprinkler head is recessed in the shield in the retracted position of the head (wherein the guard 62 abuts the seat 26), the sprinkler head in its retracted position is level with the ground and thus is completely out of the way of anybody walking or running on the ground and is out of the way of a lawn mower or any similar object which might pass over the ground.

It is readily apparent from the foregoing that proper installation and alignment of the present sprinkler is very simple and requires no special tools or particular skill to accomplish. Only a wrench for securing or detaching a nipple to or from a pipe is needed. Still further, no careful measuring and purchase of parts of special dimensions are required. The shield keeps grass from getting in the way of the sprinkler head and tends to keep dirt and debris out of the system. In addition, the instant sprinkler is self-draining, this being the purpose of the openings 32 in the ring 30 and the openings 64 in the sprinkler guard 62. Moreover the O-rings 74 and 76 prevent water from escaping from the sprinkler head, which would result in a reduction of water pressure.

An additional major advantage of the above described sprinkler is that it can be easily adjusted to realign the shield with respect to the ground if the position of the shield changes due to natural shifts in the ground level or in the location of the buried pipe. Thus, if after a period of time the top of the shield should project slightly above the ground, due to settling of the ground it can be realigned level with the ground by simply pressing it down further. If, on the other hand, the shield assumes a position in which the top thereof is slightly below the level of the ground, the sprinkler can be realigned as follows: the ground around the sprinkler and below the shield is removed and the inner sleeve rotated to increase the height of the sprinkler so that the bottom edge of flange 22 of the shield is slightly above the latest level of the earth. Then the earth is replaced and the shield pressed into the ground so that its top is level with the same again.

The instant sprinkler after installation operates in the normal manner of pop-up sprinklers, i.e., when the water is turned on the pressure causes the head to pop-up and sprinkling takes place, and when the water is turned off the head falls back to its retracted position.

Engagement between the stop face 38 and the tips 54 prevents the inner sleeve from raising when water pressure lifts the piston 16 and exerts a considerable upward force on the inner sleeve 16.

It is desired to point out that if the sprinkler head, piston and housing are omitted from the above described sprinkler, what remains is a fitting, i.e. a coupling retaining the advantages of the instant invention and usable to conveniently and accurately connect a flush sprinkling or spraying element of any kind to a buried or to be buried pipe.

In FIG. 5 a fitting 78, e.g. a coupling, embodying a modified form of the present invention is shown. Said fitting includes a pair of sleeves 80 and 82, the sleeve 80 being telescopically receivable in the sleeve 82. The fitting 78 is constructed substantially in the same manner as that of the sprinkler shown in FIGS. 1 to 4. A male buttress thread 84 is provided on the sleeve 82; said thread includes an upwardly and outwardly slanting cam face 86, and a substantially perpendicular stop face 88 the cam face faces downwardly and outwardly, and the stop face faces upwardly. The open lower end of the sleeve 82 constitutes the inlet end of the fitting and is tapped so that the sleeve can be screwed on to a nipple.

A resilient C-clip 90 is provided on the outer surface of the sleeve 78; said clip includes a bow and tips integral with the ends thereof as described with respect to the clip 50. Said tips are received in slots in the sleeve 78 the slots being 180° apart and axially spaced one-half of the pitch of the thread 84. The tips are biased by the bow in a direction into engagement with the buttress thread 84 of the sleeve 82.

The open upper end of the sleeve 80 constitutes the outlet end of the fitting and is provided with means, e.g. a male thread, for securing a stationary sprinkling element 92 thereto. An O-ring 94 is provided between the two sleeves to effect a water-tight sliding seal therebetween. Said O-ring is secured in an annular groove at the lower end of the sleeve 80 and slides in water-tight engagement with the inner surface of the sleeve 82, said ring being axially disposed between the inlet end of the sleeve 82 and the tip-receiving slots in said sleeve.

The fitting 78 operates and with the fixed head 92 can be installed in substantially the same manner as the fitting which constitutes a part of the pop-up sprinkler shown in FIGS. 1 to 4 and described in connection with the preferred form of the invention. The sleeve 80 can be moved axially with respect to the sleeve 82 so as to telescope the sleeves together without rotation but the sleeves must be rotated with respect to one another in order to obtain elongating axial movement in the opposite direction.

It thus will be seen that there are provided devices which achieve the several objects of the present invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the present invention, there is claimed as new and desired to be secured by Letters Patent:

1. For use with a flush lawn sprinkler, a fitting for manually axially adjustably securing a sprinkler head to a buried pipe, said fitting comprising a pair of open-ended rigid sleeves, one sleeve being telescopically received and axially slidable in the other sleeve whereby to provide a pair of radially facing surfaces axially movable with respect to one another, said surfaces being of different diameters thereby to provide an annular gap between said surfaces over their entire coextensive lengths, a buttress thread on the facing surfaces of one sleeve, said thread having a camming face and a stop face, a pair of circumferentially spaced camming projections, means slidably mounting each of the camming projections detachably secured to the one sleeve on the other sleeve intermediate the ends thereof for radial movement with respect to said other sleeve through said annular gap between an engaging position abutting the stop face and a retracted position abutting the camming face, said mounting means biasing the camming projections to their engaging positions, whereby said facing surfaces can be manually non-rotatably moved axially with respect to one another in the direction in which the camming face of the thread abuts the camming projections, but whereby said surfaces can only be rotatably moved axially with respect to one another in the direction in which the stop face of the thread abuts the camming projections, means on one end of one sleeve for attaching the sleeve to a buried pipe, means associated with the other sleeve for attaching said other sleeve to a sprinkler head and means slidably sealing said facing surfaces of said sleeves against passage of water.

2. For use with a flush lawn sprinkler, a fitting for manually axially adjustably securing a sprinkler head to a buried pipe, said fitting comprising a first sleeve having an outer surface and a second sleeve having an inner surface, said first sleeve being telescopically received and axially slidable in the second sleeve with the aforesaid surfaces of the sleeves radially facing one another, a buttress thread on the outer surface of the first sleeve, said thread having a camming face and a stop face, a resilient C-clip having a tip, said clip being disposed around the second sleeve, means defining a slot in said second sleeve, said tip being received in said slot and being cammably retractably biased to project past the inner surface of the second sleeve into the bore thereof, and into engagement with said thread, whereby said facing surfaces of the said sleeves can be manually non-rotatably moved axially with respect to one another in the direction in which the camming face of the thread abuts the tip of the C-clip, but whereby said surfaces can only be rotatably moved axially with respect to one another in the direction in which the stop face of the thread abuts said tip, means on one end of one sleeve for attaching the sleeve to a buried pipe, means associated with the other sleeve for attaching said other said sleeve to a sprinkler head, and means slidably sealing said facing surfaces of said sleeves against passage of water, said sealing means being located between the slot and the inlet end of the second sleeve.

3. For use with a flush lawn sprinkler, a fitting for manually axially adjustably securing a sprinkler head to a buried pipe, said fitting including an outlet and an inlet end and comprising a first sleeve and a second sleeve, one end of said first sleeve constituting the outlet end of the fitting and one end of said second sleeve constituting the inlet end of the fitting, said ends being disposed remote from one another, said first sleeve having a cylindrical outer surface said second sleeve having a cylindrical inner surface, said first sleeve being telescopically received and axially slidable in the second sleeve with the cylindrical surfaces of the sleeves radially facing one another, a buttress thread on the outer surface of the first sleeve, said thread having a camming face and a stop face, a resilient C-clip having a tip, said clip being disposed around the second sleeve, means defining a slot in said second sleeve, said tip being received in said slot and being cammably retractably biased to project past the inner surface of the second sleeve into the bore thereof, and into engagement with said thread, whereby said facing surfaces of said sleeves can be manually non-rotatably moved axially with respect to one another in the direction in which the camming face of the thread abuts the tip of the C-clip, but whereby said surfaces can only be rotatably moved axially with respect to one another in the direction in which the stop face of the thread abut said tip, attaching means for securing the fitting to a buried pipe, said means constituting a thread disposed at the inlet of the fitting, attaching means for securing a sprinkler head to the fitting, said means constituting a thread disposed on the outlet end of the fitting, means defining an annular channel in the outer surface of said first sleeve adjacent the end of said sleeve remote from the outlet end of the fitting, and an O-ring located in said channel and axially slidably sealingly engaging the inner surface of the second sleeve whereby to seal the facing surfaces of the sleeves against passage of water.

4. A flush lawn sprinkler comprising a housing including a flat top shield, means defining an opening in said shield, and a tube depending from said shield at substantially right angles thereto, said tube being connected to said shield, the bore of said tube communicating with said opening; a fitting comprising a first sleeve having an outer surface and a second sleeve having an inner surface, said first sleeve being telescopically received and axially slidable in the second sleeve with the aforesaid surfaces of the sleeves radially facing one another, a buttress thread on the outer surface of the first sleeve, said thread having a camming face and a stop face, a resilient C-clip having a tip, said clip being disposed around the second sleeve, means defining a slot in said second sleeve, said tip being received in said slot and being cammably retractably biased to project past the inner surface of the second sleeve into the bore thereof, and into engagement with said thread, whereby said facing surfaces can be manually non-rotatably moved axially with respect to one another in the direction in which the camming face of the thread abuts the tip of the C-clip, but whereby said surfaces can only be rotatably moved axially with respect to one another in the direction in which the stop face of the thread abuts the tip of the C-clip, means on one end of one sleeve for attaching the sleeve to a buried pipe, and means slidably sealing said facing surfaces of said sleeves against passage of water; means securing the other of said sleeves to said tube within the bore of said tube; a sprinkler head; and means securing and mounting said sprinkler head to said fitting for up and down movement with respect thereto, said means comprising a piston disposed in the bore of one of said sleeves, means securing said head to the end of said piston proximate to said shield, said piston being axially slidable in the bore of the sleeve in which it is disposed between an upper position in which the head extends above the shield and a lower position in which the head is substantially flush with the shield, and stop means to define the upper position of the piston.

5. A flush lawn sprinkler comprising a housing including a flat top shield, means defining an opening in said shield, and a tube depending from said shield at substantially right angles thereto, said tube being connected to said shield, the bore of said tube communicating with said opening; a fitting comprising a first sleeve having an outer surface and a second sleeve having an inner surface, said first sleeve being telescopically received and axially slidable in the second sleeve with the aforesaid surfaces of the sleeves radially facing one another, a buttress thread on the outer surface of the first sleeve, said thread having a camming face and a stop face, a resilient C-clip having a tip, said clip being disposed around the second sleeve, means defining a slot in said second sleeve, said tip being received in said slot and being cammably retractably biased to project past the inner surface of the second sleeve into the bore thereof, and into engagement with said thread whereby said facing surfaces of the said sleeves can be manually non-rotatably moved axially with respect to one another in the direction in which the camming face of the thread abuts the tip of the C-clip, but whereby said surfaces can only be rotatably moved axially with respect to one another in the direction in which the stop face of the thread abuts said tip, means on one end of one sleeve for attaching the sleeve to a buried pipe, and means slidably sealing said facing surfaces of said sleeves against passage of water; means securing said first sleeve to said tube within the bore of said tube; a sprinkler head; and means securing and mounting said sprinkler head to said fitting for up and down movement with respect thereto, said last-named means comprising a piston disposed in the bore of said first sleeve, means securing said head to the end of said piston proximate to said shield, said piston being axially slidable in the bore of said first sleeve between and upper position in which the head is extended above the shield and a lower position in which the head is substantially flush with the shield, stop means to define the upper position of the piston, and means to define the lower position of the same.

6. A flush lawn sprinkler comprising a housing including a flat top shield, means defining an opening in said shield, and a tube depending from said shield at substantially right angles thereto, said tube being connected to said shield, the bore of said tube communicating with said opening; a fitting including an outlet and an inlet end and comprising a first sleeve and a second sleeve, one end of said first sleeve constituting the outlet end of the fitting and one of said second sleeve constituting the inlet end of the fitting, said ends being disposed remote from one another, said first sleeve having a cylindrical outer surface and a second sleeve having a cylindrical inner surface, said first sleeve being telescopically received and axially slidable in the second sleeve with the cylindrical surfaces of the sleeves radially facing one another, a buttress thread on the outer surface of the first sleeve, said thread having a camming face and a stop face, a resilient C-clip having a tip, said clip being disposed around the second sleeve, means defining a slot in said second sleeve, said tip being received in said slot and being cammably retractably biased to project past the inner surface of the second sleeve into the bore thereof, and into engagement with said thread whereby said facing surfaces of said sleeves can be manually non-rotatably moved axially with respect to one another in the direction in which the camming face of the thread abuts the tip of the C-clip, but whereby said surfaces can only be rotatably moved axially with respect to one another in the direction in which the stop face of the thread abuts said tip, attaching means for securing the fitting to a buried pipe, said means constituting a thread disposed at the inlet end of the fitting, means defining an annular channel in the outer surface of said first sleeve adjacent the end of said sleeve remote from the outlet end of the fitting, and an O-ring located in said channel and axially slidably sealingly engaging the inner surface of the second sleeve whereby to seal the facing surfaces of the sleeves against the passage of water, means securing the other of said sleeves to said tube within the bore of said tube; a sprinkler head; and means securing and mounting said sprinkler head to said fitting for up and down movement with respect thereto, said means comprising a piston disposed in the bore of one of said sleeves, means securing said head to the end of said piston proximate to said shield, said piston being axially slidable in the bore of the sleeve in which it is disposed between an upper position in which the head is extended above the shield and a lower position in which the head is substantially flush with the shield, and stop means to define the upper position of the piston.

7. A fitting as set forth in claim 1 said fitting being for use with a flush lawn sprinkler, the lawn sprinkler comprising a housing including a flat top shield, means defining an opening in said shield, and a tube depending from said shield at substantially right angles thereto, said tube being connected to said shield, the bore of said tube communicating with said opening, a sprinkler head, a sprinkler head attaching means securing and mounting said sprinkler head for up and down movement with respect to the fitting, said means comprising a piston in the bore of one of said sleeves, means securing said head to the end of said piston proximate to said shield, said piston being axially slidable in the bore of the sleeve in which it is disposed between an upper position in which the head is extended above the shield and a lower position in which the head is substantially flush with the shield, means securing one of said sleeves to said tube within the bore of said tube and stop means to define the upper position of the piston.

References Cited by the Examiner
UNITED STATES PATENTS

| | | | |
|---|---|---|---|
| 1,833,040 | 11/1931 | Rader | 285—302 |
| 2,514,346 | 7/1950 | Snoddy | 239—204 |
| 2,706,134 | 4/1955 | Wilson et al. | 239—201 |
| 3,083,914 | 4/1963 | Smith et al. | 239—201 |
| 3,104,822 | 9/1963 | Muschett | 239—206 |

EVERETT W. KIRBY, *Primary Examiner.*